Sept. 22, 1970    H. G. WOTEN    3,529,870
INSULATING MACHINE
Filed July 16, 1968    3 Sheets-Sheet 1
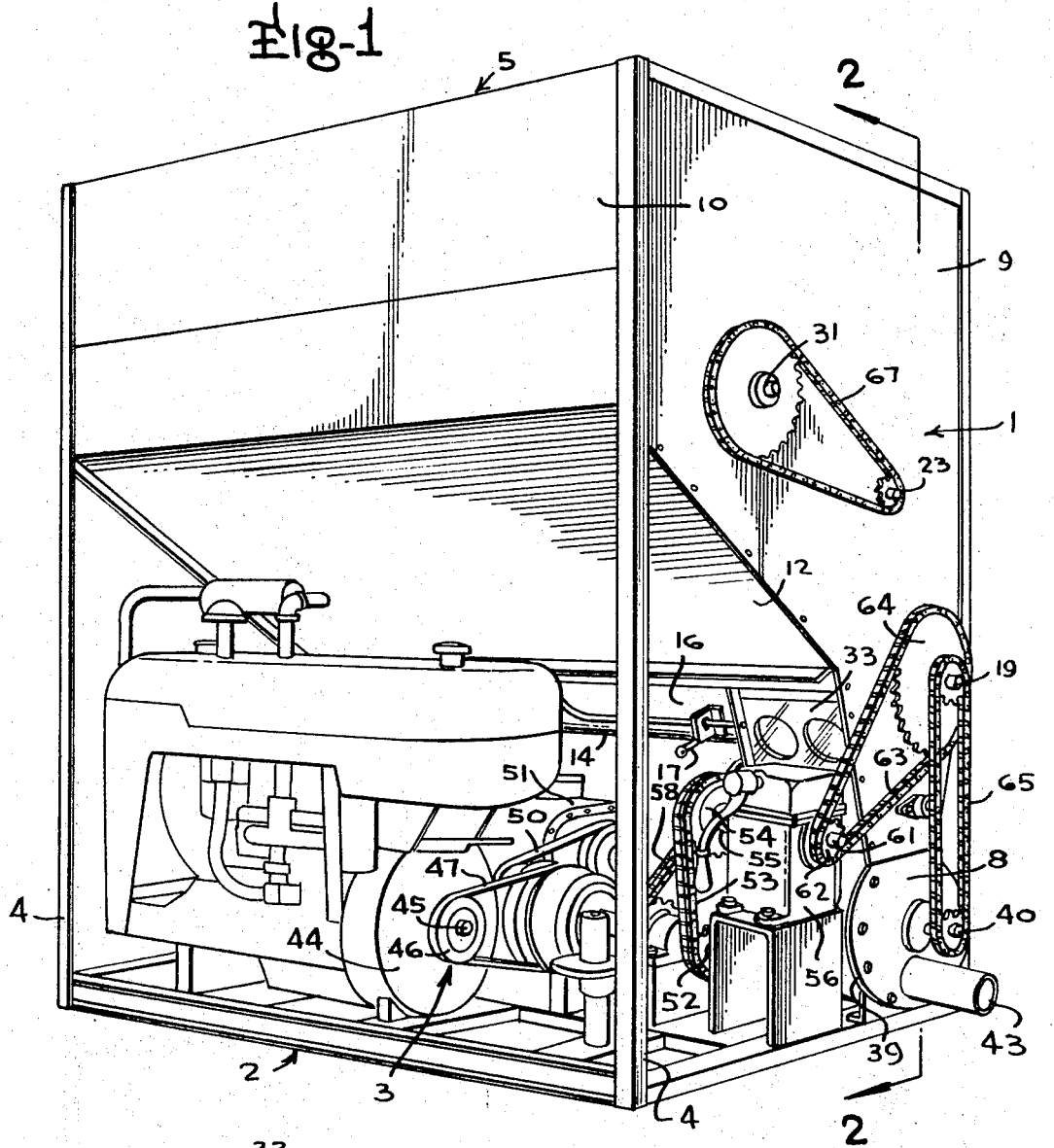
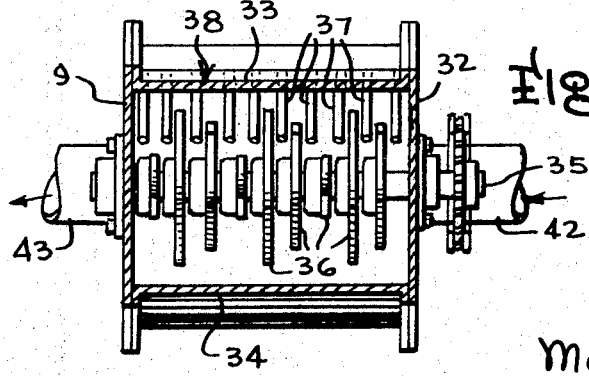
INVENTOR
HOMER G. WOTEN
BY Mason, Fenwick & Lawrence
ATTORNEYS

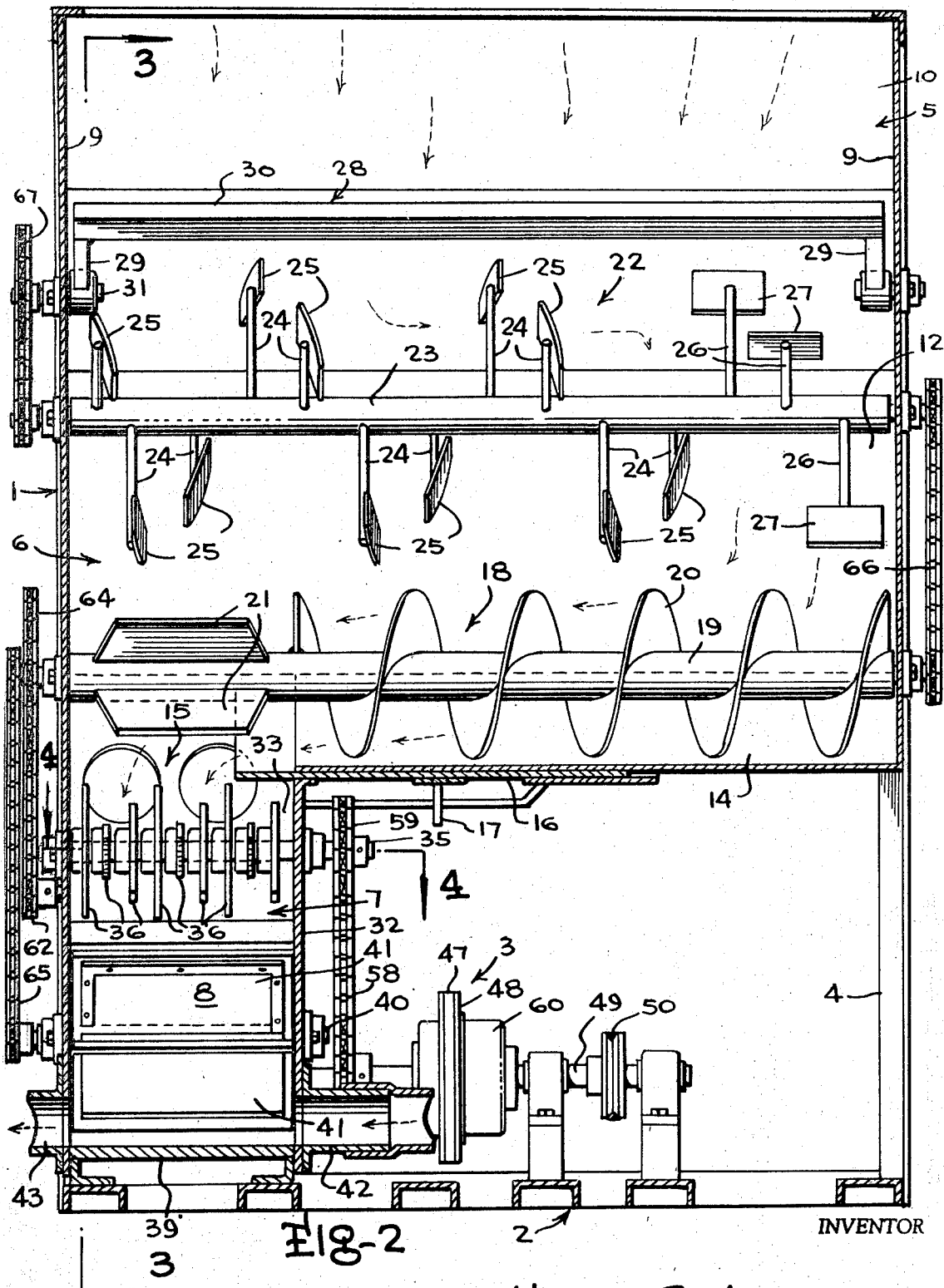

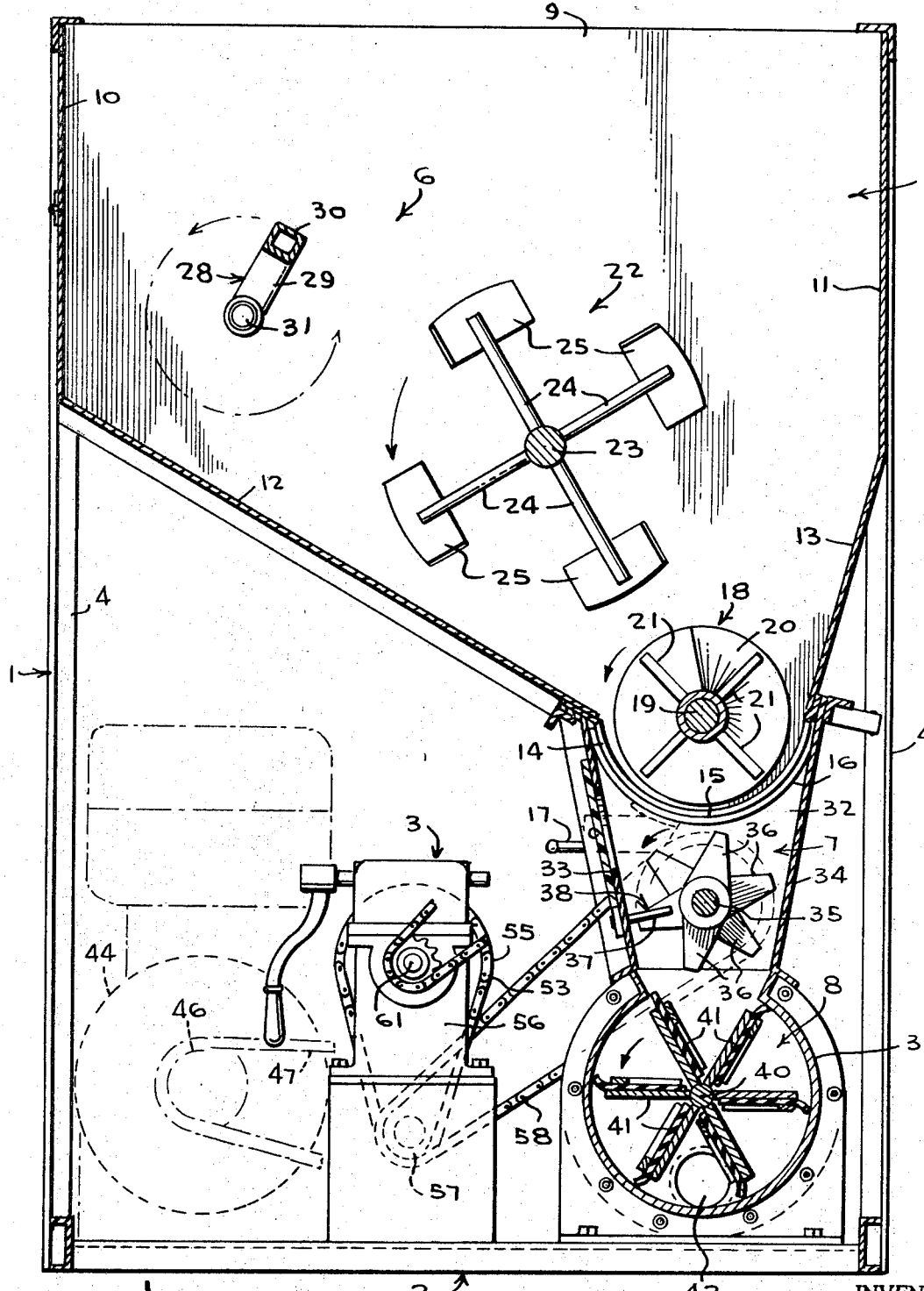

United States Patent Office 3,529,870
Patented Sept. 22, 1970

3,529,870
INSULATING MACHINE
Homer G. Woten, 912 Perrin Ave. NW.,
Winter Haven, Fla. 33880
Filed July 16, 1968, Ser. No. 745,239
Int. Cl. B65g 53/40
U.S. Cl. 302—49      5 Claims

ABSTRACT OF THE DISCLOSURE

A feeder for particulate material having a hopper into which material is fed. A feed auger is in a trough at the hopper bottom to feed material to an adjustable opening at one side. A circulator to feed material oppositely to the auger is adjacent the auger to remove excess material from the opening for recirculation and to prevent bridging of the material over the auger. A rotating jogger prevents bridging over the circular. Material flows from the opening into a granulator where rotating fingers moving between stationary fingers separate adhered particles. Material flows from the granulator into pockets in a rotary air lock for transfer to a pressurized air feed line.

BACKGROUND OF THE INVENTION

This invention relates to apparatus for feeding particulate material, and is particularly adapted to feeding "loose fill" insulating material, such as granulated rock wool, granulated mineral fiber wools, glass fiber materials, cellulose fibers, expanded mica, etc., from a source of supply to the point of deposit in a wall, ceiling, etc.

So-called "loose fill" insulating material has been in use for some time. It is usually packed under compaction in bags or bales. The containers are opened, and the material is dumped into a hopper for feeding into an air hose line for conveying to the area to be insulated. The material is very light in weight, being composed of low density nodules which have been somewhat compressed in the package. The individual nodules should be separated from one another and allowed to expand to full size before placement in a wall. The very nature of the material makes feeding difficult, for the slightest obstruction will overcome gravity, and the material is very susceptible to compression and compaction.

Present day feeding equipment usually includes a hopper, into which the material in dumped, and an auger at the bottom of the hopper to feed the material toward one end where there is a variable orifice gate to control the rate at which the material flows from the hopper into an air lock and then into the air hose line. Necessarily, the screw auger is driven at a sufficient speed to supply material to the gate when the gate is open to its fullest. This supplies excess material when the gate is partially closed, causing the material to build up and compact about the auger adjacent the gate. Soon, an area of compaction builds up about the auger and the material bridges over the auger and none falls into the auger path. When this occurs, the auger is rotating within a tunnel, conveying no material to the gate. It is then necessary to break up the compacted area to restart feeding. Not only is feeding difficult, but whenever there is compression the nodules of material do not fully expand. This results in loss of bulk for filling and an increase in density in the insulated area. The first causes increased costs for material, and the second results in loss in dead air space in the wall.

Prior machines had no means for adjushtment to conditions, such as changes from horizontal to vertical insulation areas, different material densities, nodule size or resin content, or feeding speed, dust and other variables.

Another problem with existing machines has been pulsations in feeding flow. This creates various densities in various areas, and makes a level, smooth, dust-free job almost impossible.

SUMMARY OF THE INVENTION

The principal object of the present invention is to provide feeding apparatus that will feed material uniformly in expanded form with the particles separated so that a maximum bulk, even density deposit can be made.

A more specific object of the invention is to provide a feeder wherein the material is positively moved at all times and there is no reliance upon gravity as a material-moving means.

Another object is the provision of a feeder having a rate control outlet gate with means to prevent any pressure build up in the area of the gate.

A further object is to provide a feeder in which no bridging of the material over a feed auger can occur.

Still another object of the invention is to provide a feeder in which the separate particles, or nodules, of the material being fed will be positively separated during the feeding operation.

Yet a further object is to provide a feeder having various means for adjustment so that materials and conditions of various kinds can be compensated for to maintain a proper feed flow.

Other objects of the invention will become apparent from the following description of one preferred embodiment theerof, when taken in conjunction with the drawings which accompany, and form part of, this specification.

BRIEF DESCRIPTION OF THE DRAWINGS

FIG. 1 is a perspective view of feeding apparatus incorporating the principles of the present invention;

FIG. 2 is a vertical, longitudinal section through the apparatus, taken substantially on the line 2—2 of FIG. 1;

FIG. 3 is a vertical, transverse section through the apparatus, taken adjacent one end substantially on the line 3—3 of FIG. 2; and FIG. 4 is a horizontal section through the granulator, taken on the line 4—4 of FIG. 2.

DESCRIPTION OF THE PREFERRED EMBODIMENT

Referring to the drawings in detail, the feeding apparatus is shown as a unitary device 1 which can be mounted on a truck, or other mobile means, for transportation to various locations where insulation work is to be done. The unit includes a base 2 to support the drive mechanism 3. Posts 4 rise from the corners of the base 2 to support a hopper 5. The hopper houses material feeding mechanism 6, and there is a granulator 7 and an air lock 8 in depending relation beneath the hopper.

Hopper 5 has end walls 9, vertical front and back walls 10 and 11, and downwardly converging lower walls 12 and 13. An arcuate trough extends the full length of the hopper and forms a bottom. At one end of the hopper, the arcuate trough is cut away at the bottom to form a material outlet 15. The outlet is of predetermined size, and sufficiently large to accommodate the greatest outflow of material to be desired. In order to make the size of the outlet adjustable, and therefore control the flow rate through it, there is a sliding gate 16 mounted for movement across the gate lengthwise of the trough. Any convenient means may be used for adjusting the gate to provide desired outflow, and the gate is shown as having a handle 17 attached to it to facilitate its movement.

An auger 18 is mounted concentrically with the trough 14, and has a shaft 19 which extends through the end walls 9 of the hopper. An auger screw 20 extends from the opening 15 to the opposite end wall of the hopper, and radial paddles 21 are mounted on the shaft and extend along the shaft the major portion of the length of the outlet 15. The auger screw spiral and the direction of rotation of the auger is such that material will be moved toward the outlet 15. Paddles 21 will help to move material through the opening 15 into the granulator 7, and, at the same time will lift excess material into the path of a circulator 22 mounted in the hopper above, and parallel to the auger 18.

Circulator shaft 23 also extends the full length of the hopper, and, although it is parallel to the shaft 19 of the auger, it is not in the same vertical plane with the auger shaft but is offset forwardly of that plane. Circulator shaft 23 carries a plurality of arms 24 which extend radially from the shaft and are mounted in a spiral pattern about the shaft. Each arm carries a paddle blade 25. The paddle blades are angularly related to the arms which support them, and the angular position of the blades and the arrangement of the arms cause the paddles to form portions of a discontinuous spiral about the circulator shaft. The paddle angle and the direction of shaft rotation is such that material is moved from the area over the outlet 15 toward the opposite end of the hopper. At the end of shaft 23, remote from the outlet 15, there are arms 26 on the shaft 23 which carry paddle blades 27 which are parallel to the longitudinal axis of shaft 23. Thus, material moved toward the end of the hopper by the paddles 25 will be moved into the path of rotation of paddles 27, which will push the material downwardly into the auger screw 20 to provide a continuous supply of material to the auger.

In order to prevent the material from bridging over the circulator, a jogger 28 is mounted above, and forwardly of, the circulator. This is simply a U-shaped member, having arms 29 adjacent the ends of the hopper connected by a jogging bar 30. Arms 29 are mounted on stub shafts 31 which extend through the end walls of the hopper. Rotation of the stub shafts 31 will cause the jogger bar 30 to move in a circular path through the material to keep it loose and free flowing, with a constant supply in the path of operation of the circulator 22.

When the material flows down in the hopper through the outlet 15, it falls into the granulator 7. The granulator is in a passage from the hopper to the air lock which is defined by a downward extension of one end wall 9 of the hopper and a companion wall 32 spaced therefrom at the opposite edge of the outlet 15. Downwardly converging front and back walls 33 and 34 complete the enclosure. Extending lengthwise of the granulator chamber, between the end walls 9 and 32, there is a shaft 35 which has its ends extending through these end walls. A plurality of fingers, or hammers, 36 are mounted along the shaft in spaced relation. These members have central hubs mounted on the shaft and the hammer members extending in diametric relation to the central hub. The several members are mounted at various angles relative to one another. These hammers move between spaced fingers 27 of a fixed stator 38 mounted on the front wall 33 of the granulator housing. Rotation of shaft 35 causes the hammers to move between the fingers 37 causing adhered nodules of insulating material to be separated from one another. In fact, any remaining compaction, or adherence, of the material at this point is broken up.

From the granulator, material drops into a rotary, vane-type air lock 8. The air lock consists of a cylindrical casing 39, in which is mounted a rotor having a shaft 40 with a plurality of radially extending vanes 41. Material falling from the granulator drops into the pockets formed between adjacent vanes 41 and is carried around the casing 39 until the pocket is in alignment with an inlet hose 42 and the entrance to a material transporting hose 43. The inlet hose is connected to a suitable source of air under pressure, and material in the air lock pockets is blown out into the hose line 43 for deposit in the wall.

The various operating mechanisms of the feeder may be driven in any desired manner so long as they are provided with means to rotate them in the proper direction. It will be noted from FIG. 3, that the several conveying means are so designed that all of the shafts of the machine rotate in a counterclockwise direction when viewed from the outlet end of the machine. The drive shown consists of a motor 44, mounted on the base 2, and having a drive shaft 45. A drive pulley 46 is fixed on the end of the drive shaft. A belt 47 passes around the pulley 46 and over a pulley 48 on a clutch shaft 49. A second belt 50 on the clutch shaft may drive a compressor 51 to supply air under pressure to the air line inlet hose 42. The clutch shaft carries a sprocket 52, and a chain 53 passes around this sprocket and a sprocket 54 on a shaft 55 of a gear reducer 56. There is another sprocket 57 on clutch shaft 49, and a chain 58 around this sprocket also passes around a sprocket 59 on the end of the granulator shaft 35. Thus, the granulator will be driven at a definite speed relative to the motor speed whenever the motor is operating and clutch 60 is engaged.

The output shaft 61 of the gear reducer 56 carries a sprocket 62 which drives a chain 63 passing over a sprocket 64 on the auger shaft 19. This enables the auger shaft, and any shaft driven from the auger shaft, to be subject to speed changes relative to the motor speed. A chain 65 drives the air lock shaft 40 from the auger shaft 19. At the opposite end of the machine, auger shaft 19 drives the circulator shaft 23 by means of a chain 66. The other end of the shaft 23 carries a chain 67 which drives the jogger stub shaft 31. This completes the drives for the several rotating elements.

When the device is to be used, bags or bales of insulating material will be opened and the contents dumped into the hopper 5 of the machine. With the motor running and the motor speed adjusted to the desired rate, the gear reducer set at the proper ratio, and the outlet gate 16 set as required, the material in the hopper will be constantly kept in motion and agitated by the revolution of several elements in the hopper. Jogger 28 will keep the material loose and free flowing in the area of the circulator 22. Circulator 22 will move the material along the hopper toward the side remote from the outlet. When the material reaches the far wall, the paddle blades 27 will cause it to move downwardly into the path of the auger 18, the auger will move the material back toward the outlet 15. As the material reaches the outlet some will fall through and other material will be positively moved through by the rotation of the blades 21. If gate 16 has been adjusted so as to reduce the size of the opening 15, the amount of material conveyed by the auger will be greater than is necessary to keep a supply moving through the opening, and the paddles 21 will lift the excess material back into the area of influence of the circulator 22, where it will be recycled. As the material falls through the opening 15 it is struck by the rotating hammers 36 of the granulator and the particles of material which are still adhering will be separated. As the hammers move between the fingers 37 of the stator, there will be a positive stripping of the particles, or nodules, from one another. The completely separated and expanded particles are then moved by the granulator hammers into the pockets of the air lock 8. As the pockets rotate, they are brought into alignment with the inlet and delivery hoses 42 and 43 and the material is blown from the pocket through the delivery hose to the point of application.

It is to be noted that at all times the material is kept in movement and there is no opportunity for compaction. In the hopper, the jogger prevents any possibility of bridging around the circulator, and the circulator, in turn, produces the same function with respect to the auger. There can be no accumulation of material at the outlet due to reduction in outlet size, for all excess material is carried upwardly and recirculated. All particles will be completely free and separate after they have passed through the granulator. Due to the freedom of movement and separation of the particles without compaction, full expansion of the particles can take place before the particles reach the point of delivery. It is also to be noted that the material is moved positively by the various elements and that there is no reliance upon gravity to accomplish the conveying movement. This is quite essential in handling material as light as that used in modern day insulation.

The several speed adjustments possible will enable an operator to so control the feeding mechanism that he can achieve perfect area filling under all conditions with all materials.

While in the above, one specific embodiment of the invention has been disclosed, it will be understood that the particular construction shown and described is merely by way of example and the invention may take other forms within the scope of the appended claims.

What is claimed is:

1. Apparatus for feeding particulate material comprising, a hopper having a bottom, an outlet opening at one end of the bottom, an auger having a shaft mounted in the hopper parallel to the bottom and an auger blade on the shaft rotatable to move material along the hopper bottom toward the outlet opening, radial blades on the shaft over the outlet opening, the blades extending along the shaft parallel to the shaft axis to positively move material brought to the opening by the auger through the outlet opening, a granulator beneath the outlet opening having fixed spaced fingers along one side and a rotor having spaced hammers movable between the fixed fingers to break up compacted material passing through the outlet opening and push the material downward, an air lock beneath the granulator to receive material pushed downwardly by the granulator, and an air line connected to the air lock to pick up material fed through the air lock.

2. Apparatus for feeding particulate material as claimed in claim 1, wherein there is a gate mounted on the hopper bottom and movable over the outlet opening to vary the size of the opening, the blades on the auger shaft serving to move upwardly excess material fed to the outlet opening by the auger when the gate is partially across the outlet opening, and a circulator mounted in the hopper above and parallel to the auger, the circulator having a shaft and blades mounted angularly on the shaft to move material in the hopper in a direction opposite to the movement of the material by the auger and to receive excess material moved upwardly by the parallel blades on the auger shaft and move the excess material away from the outlet opening.

3. Apparatus for feeding particulate material as claimed in claim 2, wherein there are radial blades on the circulator shaft at the end remote from the outlet opening, the circulator radial blades extending parallel to the circulator shaft axis to positively move material above the auger downwardly into the auger blade.

4. Apparatus for feeding particulate material as claimed in claim 3, wherein there are rotatable means in the hopper parallel to and adjacent the circulator to loosen material in the hopper adjacent the circulator.

5. Apparatus for feeding particulate material as claimed in claim 3, wherein there are cranks mounted in alignment at opposite ends of the hopper, and a bar connecting the cranks for movement in an orbital path parallel to and adjacent the circulator to loosen material in the hopper adjacent the circulator.

References Cited

UNITED STATES PATENTS

| | | | |
|---|---|---|---|
| 1,095,383 | 5/1914 | Cole | 222—238 |
| 2,355,358 | 8/1944 | Anderson. | |
| 2,650,002 | 8/1953 | Farley | 222—238 |
| 3,135,561 | 6/1964 | Kempthorne | 302—49 |

ANDRES H. NIELSEN, Primary Examiner

U.S. Cl. X.R.

302—36